United States Patent
Dougherty

Patent Number: 5,913,995
Date of Patent: Jun. 22, 1999

[54] METHOD FOR FABRICATING BOAT HULLS AND OTHER LAMINATE COMPONENTS

[76] Inventor: Robert J. Dougherty, 243 Quayassisi St., New Smyrna Beach, Fla. 32167

[21] Appl. No.: 08/824,922

[22] Filed: Mar. 27, 1997

[51] Int. Cl.[6] ............................. B31F 1/20; B29C 65/00
[52] U.S. Cl. ........................ 156/210; 156/286; 264/102
[58] Field of Search ............................. 156/84, 87, 196, 156/210, 286; 264/102

[56] References Cited

U.S. PATENT DOCUMENTS

| | | | |
|---|---|---|---|
| 3,775,214 | 11/1973 | Winters | 156/245 |
| 3,861,977 | 1/1975 | Wiley | 156/242 |
| 4,504,341 | 3/1985 | Radzwill et al. | 156/102 |
| 4,816,106 | 3/1989 | Turris et al. | 156/285 |
| 5,034,256 | 7/1991 | Santiso, III et al. | 428/73 |
| 5,108,532 | 4/1992 | Thein et al. | 156/285 |
| 5,131,834 | 7/1992 | Potter | 425/389 |
| 5,316,607 | 5/1994 | Johnsen et al. | 156/212 |
| 5,427,518 | 6/1995 | Morizot et al. | 425/504 |
| 5,589,243 | 12/1996 | Day | 428/56 |

OTHER PUBLICATIONS

IBM Technical Disclosure Bulletin, Mar., 1967–vol. 9, No. 10.

Primary Examiner—Christopher A. Fiorilla
Attorney, Agent, or Firm—Edward M. Livingston, Esq.

[57] ABSTRACT

Sandwich fiberglass laminate components and a process for fabricating same for boats and the like. The process employs a unique vacuum manifold (12) incorporated into the mold to an inner layer (3) of the component. Also, recesses in the mold are covered with pre-made inserts (22) molded into the layer to form hollow boxes (4, 5) for instruments, consoles and beams. The hollow boxes may be reinforced with metal inserts (20) for attaching support beams. Atmospheric feed holes (21) are drilled into the hollow boxes to prevent collapse of the boxes during the molding process and to yield a better mold. After the molding process the periphery of the component may be trimmed to form an integral edge (7) of the component. This process results in a sandwich fiberglass boat hull or other component having finished inner (3) and outer (2) layers with hollow boxes for instruments, consoles and support beams which are integral with at least one layer of the component and edges without layer separation.

12 Claims, 3 Drawing Sheets

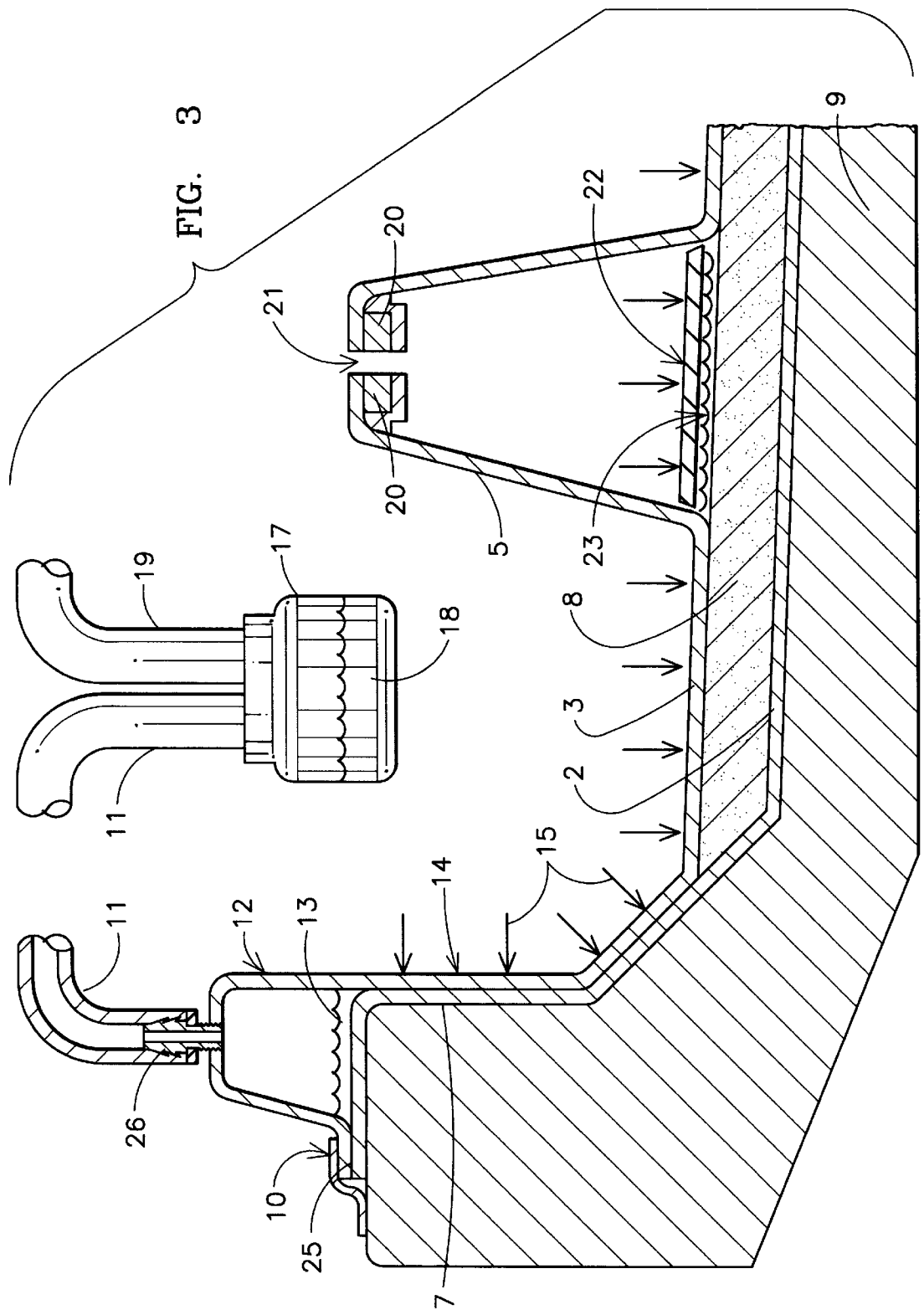

METHOD FOR FABRICATING BOAT HULLS AND OTHER LAMINATE COMPONENTS

BACKGROUND OF THE INVENTION

This invention relates to the method or process for fabricating sandwich fiberglass laminates for boat hulls, components and the like.

Fiberglass components for marine vessels are normally made using an open mold by a molding technique known as "vacuum bagging." Unfortunately, vacuum bagging leaves bubbles which must be eliminated. Also, an open mold leaves only the outside layer of the component having a finished quality, thereby resulting in the inside layer having to be finished by hand, a time consuming and costly operation. Furthermore, hollow boxes for holding instruments, support beams, consoles and the like must be separately attached and added as the hollow boxes cannot be made part of the mold. Again, more time and costs are expended. Even furthermore, such fiberglass components made of several layers of laminate have a separation of layers at the edges, thereby requiring the edges to be sealed or covered after the molding process to avoid water intrusion and the separation of the layers at the edges.

Therefore, a great need exists for a molding process for making sandwich fiberglass components which solves the above problems.

The prior art includes numerous examples of molding processes, but none like the present invention. For instance, U.S. Pat. No. 4,504,341 issued to Radzwill, et al. on Mar. 12, 1985, teaches a method of shaping and laminating transparencies for use in aircraft and uses an atmospheric "bleed" hold in the process. An IBM Technical Disclosure, dated March, 1967, discloses a lamination method using a vacuum in a lower chamber with pressure applied from above. U.S. Pat. No. 5,108,532 issued to Thein, et al. on Apr. 28, 1992, teaches another method of forming plastic composite parts by drawing a vacuum on the bottom and applying pressure on top to shape an article. U.S. Pat. No. 4,816,106 issued to Turris, et al. on Mar. 28, 1989, discloses another method for molding plastic which uses an atmospheric "bleed" hole in the process. U.S. Pat. No. 3,861,977 issued to Wiley on Jan. 21, 1975, discloses a method of bonding a core layer between to shell layers. U.S. Pat. No. 5,131,834 issued to Potter on Jul. 21, 1992, discloses a vacuum bag molding method for consolidating composite parts. U.S. Pat. No. 3,775,214 issued to Winters on Nov. 27, 1973, discloses a method of fabricating hollow frames for boats which uses partial vacuum and atmospheric pressure. U.S. Pat. No. 5,427,518, issued to Morizot, et al. on Jun. 27, 1995, discloses another method of vacuum molding composites using an outside pressure source to keep a layer on a mold. Finally, U.S. Pat. No. 5,316,607 issued to Johnsen, et al. on May 31, 1994, teaches a method of making an ostomy device using a vented vacuum chamber.

Contrary to the afore-referenced prior art, the present invention allows for the manufacture of fiberglass components with a finish on both the outside and inside laminates. Furthermore, the present invention allows hollow boxes to be made part of the laminate by use of an atmospheric "feed" hole. The process disclosed in the present invention also involves the use of a vacuum manifold as part of the lay up which eliminates the edge separation of laminates typical of prior processes.

SUMMARY OF THE INVENTION

The major objects of the present invention are to provide a molding process that:

Allows the fabrication of sandwich fiberglass laminates which are finished on both sides;

Allows the inclusion of hollow boxes for on-deck consoles instruments, leg supports and other items to be incorporated into one of the laminate layers in the same mold;

Eliminates edge separation of laminates;

Allows a continuous inner skin along hollow boxes for on-deck consoles, instruments and beams to eliminate discontinuity to the inside of a sandwich laminate;

Reduces the time involved in the molding process; and

Reduces the costs, particularly cost of labor, involved fabrication of fiberglass laminates.

The present invention fulfills the above and other objects by providing a novel and non-obvious process for fabricating sandwich fiberglass laminates having a central core layer secured between two layers of fiberglass which are both in finished condition. This process allows hollowed chambers for support beams, instruments and on-deck consoles and other uses to be made integral with the component as part of one of the layers of laminates. Further, the process also enables the hollow chambers to have a continuous inner skin to eliminate discontinuity in the layer of laminate. The process initially involves placing a layer of fiberglass laminate in a mold into which is built a recess for a manifold about a periphery of the mold. The mold may also contain recesses for the hollow boxes to hold console beams, instruments and the like. After the layer of fiberglass has cured and the layer is still in the mold, a pre-made fiberglass insert is placed across any recess for a hollow box and fiberglass laminate is placed over the insert and allowed to cure to form a continuous inside laminate surface over the recess for a hollow box. A small hole is then drilled into any recess for the hollow box to form an atmospheric feed hole for use later in the process.

A second layer of fiberglass laminate is molded in a bottom mold. Then core material is covered with resin and placed on the second fiberglass layer and the first fiberglass layer is placed over the core material after spraying all exposed inside layers of the first and second fiberglass layers. Sealing means, such as tape, is used to form a seal entirely around the periphery of the mold. Then a vacuum conduit is connected to a vacuum pipe placed in the manifold recess and a vacuum pump is started to create sufficient vacuum to bring the layers of laminate together for bonding with the help of atmospheric pressure pushing on the top layer of laminate and through the feed hole on the insert in each hollow box. Excess resin is preferably removed to a resin trap located in the conduit between the vacuum manifold and the vacuum pump.

After the layers are bonded together, in the case of boat "T"-tops the component can be cut inward of the vacuum manifold leaving an edge for the component having no separation. Alternatively, if boat hulls are being constructed, then the vacuum manifold can be left on to form a gunwale. Early in the process when the first fiberglass layer is made prior to the installation of the insert over each hollow box, metal pieces, such as aluminum, can be placed in the bottom of the recess and laminated with fiberglass to provide strength for holding bolts for support beams.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 3 is a partial side cross-sectional view of the boat top in a bottom mold during the molding process;

DESCRIPTION OF THE PREFERRED EMBODIMENTS

Figure 1:
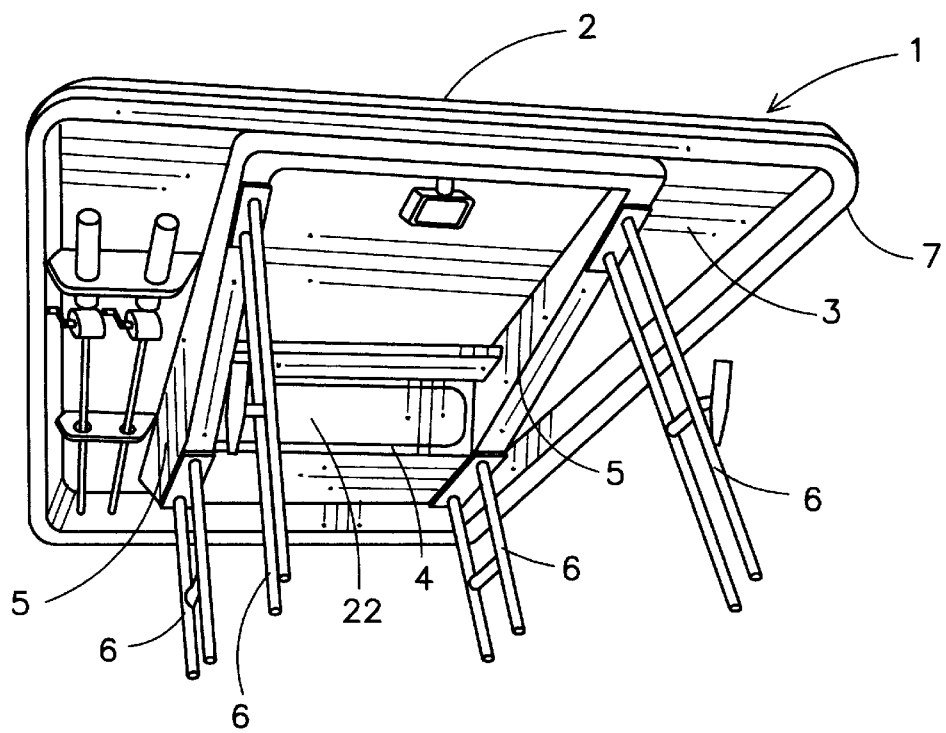
FIG. 1 is a perspective view of a boat top with hollow boxes for holding beams and instruments on a boat.

For purposes of describing the preferred embodiment, the terminology used in reference to the numbered components in the drawings is as follows:

1. boat "T"-top
2. outer fiberglass layer
3. inner fiberglass layer
4. hollow box (for instruments)
5. hollow box for beams or consoles
6. support beams
7. edge of boat top
8. core material
9. bottom mold
10. sealing tape
11. vacuum conduit (hose)
12. vacuum manifold
13. excess resins
14. trim lines
15. atomospheric pressure lines
16. hose on vacuum trap from vacuum manifold
17. vacuum trap
18. resin in trap
19. conduit (hose) from vacuum trap to vacuum pump
20. inserts for fastening support beams
21. atmospheric feed hole
22. insert
23. secondary resin lay up
24. nuts & bolts for securing legs
25. peripheral flange of outer & inner fiberglass layers
26. vacuum pipe
27. gunwale
28. top of tunnel
29. control cable tunnel Referring to FIG. 1, a sandwich fiberglass laminate component for a boat, particularly a boat "T"-top 1, is illustrated. A boat top 1 has an outer or outside top fiberglass layer 2 and an inner or underside fiberglass layer 3 with a core layer (not shown) bonded between the two layers. Hollow boxes 5 extend the underside layer 3 for support beams 6 and for holding instruments 4 and other items. Each of the hollow boxes has an inner insert 22 molded into the inner layer 3 to prevent any discontinuities in the laminate layer. By contrast previous processes for making sandwich fiberglass laminated components do not allow hollow boxes to be formed as part of the inner fiberglass layer 3, but must be attached separately after the molding process. On its periphery the boat top 1 has an edge 7 in which the outer fiberglass layer 2 and inner fiberglass layer 3 are bonded together and are not separated as in the case of conventional molding processes.

Figure 2:
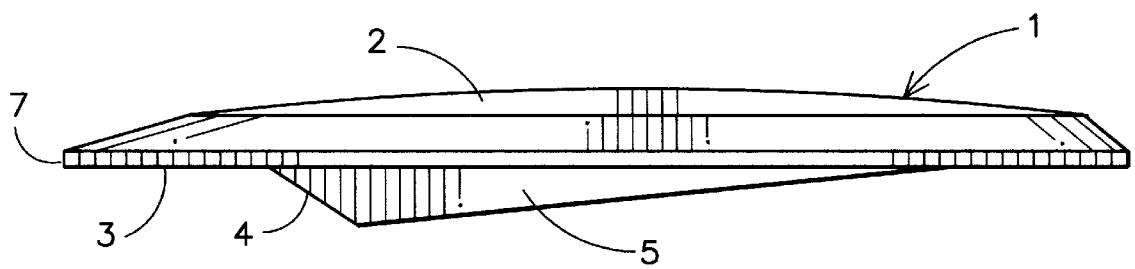
FIG. 2 is a side view of a boat top like that shown in FIG. 1.

FIG. 2 shows the boat top component by itself without support beams 6 having the same components as discussed in relation to FIG. 1.

FIG. 3 is a partial side cross-sectional view of the boat top component during the molding process. The first step in the molding process is to make the inner fiberglass layer 3 in a separate mold (not shown) which contains recesses 5 for support beams, instrument boxes and other items. The mold also has a recess around its periphery to make a vacuum manifold 12 in the inner fiberglass layer 3 during the molding process. Once the inner laminate 3 has been cured then each recess in the mold which later becomes a hollow box for beams, instruments and the like is covered with a premade fiberglass insert 22. Then secondary resin layup 23 is applied over the insert and onto the inner fiberglass layer 3 and allowed to cure. Once the secondary resin layup 23 has cured it provides a continuous membrane integral with the inner layer 3.

If the hollow box 5 is going to be used as a beam support, then prior to placing the fiberglass insert 22 over the recess an aluminum insert 20 is molded into the bottom of the box 5 and covered with fiberglass laminate. This aluminum insert 20 provides strength for holding the bolts necessary to attach the support beam 6 to the hollow box 5.

Once the inner fiberglass layer 3 has cured, it is removed from the mold and trimmed approximately one inch outside the vacuum manifold 12 to form a flange 25. Also, small atmospheric feed holes 21 are drilled in the bottom of all hollow boxes and into the bottom of the vacuum manifold 12 into which a vacuum pipe 26 is fitted.

Before, during or even after the first fiberglass layer 3 has been molded, an outer fiberglass layer 2 is molded in a separate bottom mold 9. Then a premolded core 8 made of urethane or other like material and having a predetermined thickness is covered with resin on all sides and placed on the molded outer fiberglass layer 2. The inner exposed areas of the outer fiberglass layer 3 and inner fiberglass layer 2 are also sprayed or rolled with resin. Then the pre-molded inner fiberglass layer 3 is placed into the bottom mold over the core material 8 and outer fiberglass layer 2. A sealing means, such as tape 10, is then carefully applied over the flange 25 all around the mold to provide a seal.

The vacuum hose or conduit 11 is then attached to the vacuum pipe 26 in the vacuum manifold 12. Although the vacuum conduit 11 may attach directly to a vacuum pump (not shown), it is good practice and is preferable to install a resin trap 17 between the vacuum manifold 12 and the vacuum pump in order to prevent excess resin 13 from being sucked into the vacuum pump. In this manner the excess resin 13 will enter the resin trap 17 through a vacuum conduit 11 and be trapped on the bottom of the trap 17 as excess resin 18 prior any air being pulled out the outlet conduit 19. When a boat top is being manufactured the vacuum conduit or hose 11 can become sacrificial as it will fill with resin and cure.

Depending on the particular sandwich laminate part being made, a vacuum between ten inches and twenty-six inches of mercury will be sufficient to create sufficient pressure to produce a good laminate in conjunction with assistance from downward atmospheric pressure indicated by arrows 15 along the outer surface of the fiberglass layer 3 and on the insert 22 via the atmospheric feed hole 21. The atmospheric feed hole 21 not only has a purpose of assisting the molding process, but also prevents any small leaks in the secondary resin layup 23 covering the insert 22 from building up sufficient suction in the hollow box 5, thereby collapsing it, which could occur without the use of the atmospheric feed hole 21. Once all three layers of the sandwich laminate are bonded together, then the component is trimmed inward of the vacuum manifold 12 at 14, thereby forming an edge 7 for the component which has no separation of the layers. By contrast, in components made by vacuum bag molding or other processes the inner and outer layers of the sandwich composite are actually separated by the core material 8 at the peripheral edges of the component.

Figure 4:
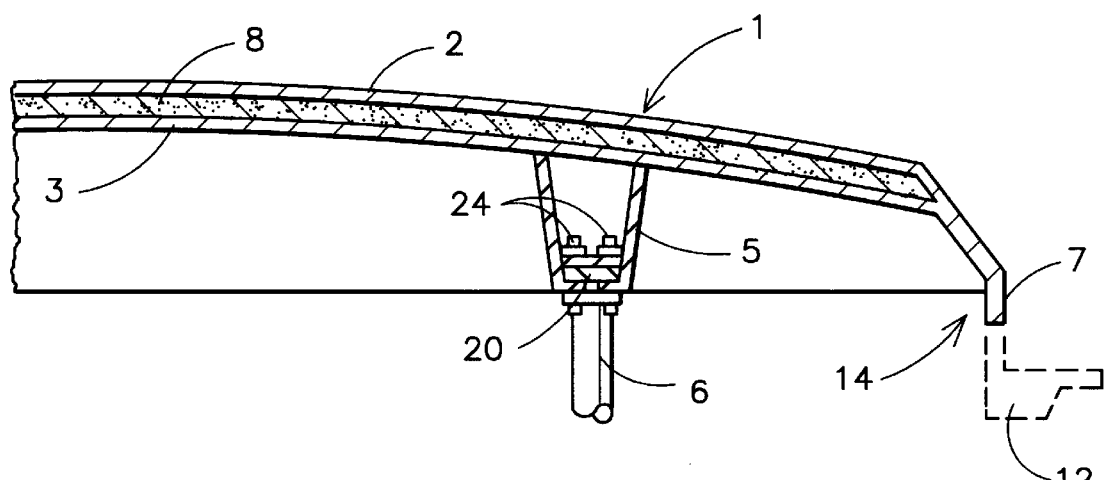
FIG. 4 is a partial side cross-sectional view of the resulting boat top after the molding process.

Once the component part for the boat top 1 is removed from the bottom mold 9 it can then be mounted on support beams 6 by drilling holes and placing nuts and bolts 24 through the aluminum metal inserts 20 at the bottom of the hollow box 5 as shown in FIG. 4.

Although this novel process has been discussed in conjunction with the fabrication of a boat top 1, this unique molding process can be used for making other sandwich composite components for other boat components, even a hull of the boat, or for other products for the marine as well as other industries.

Figure 5:
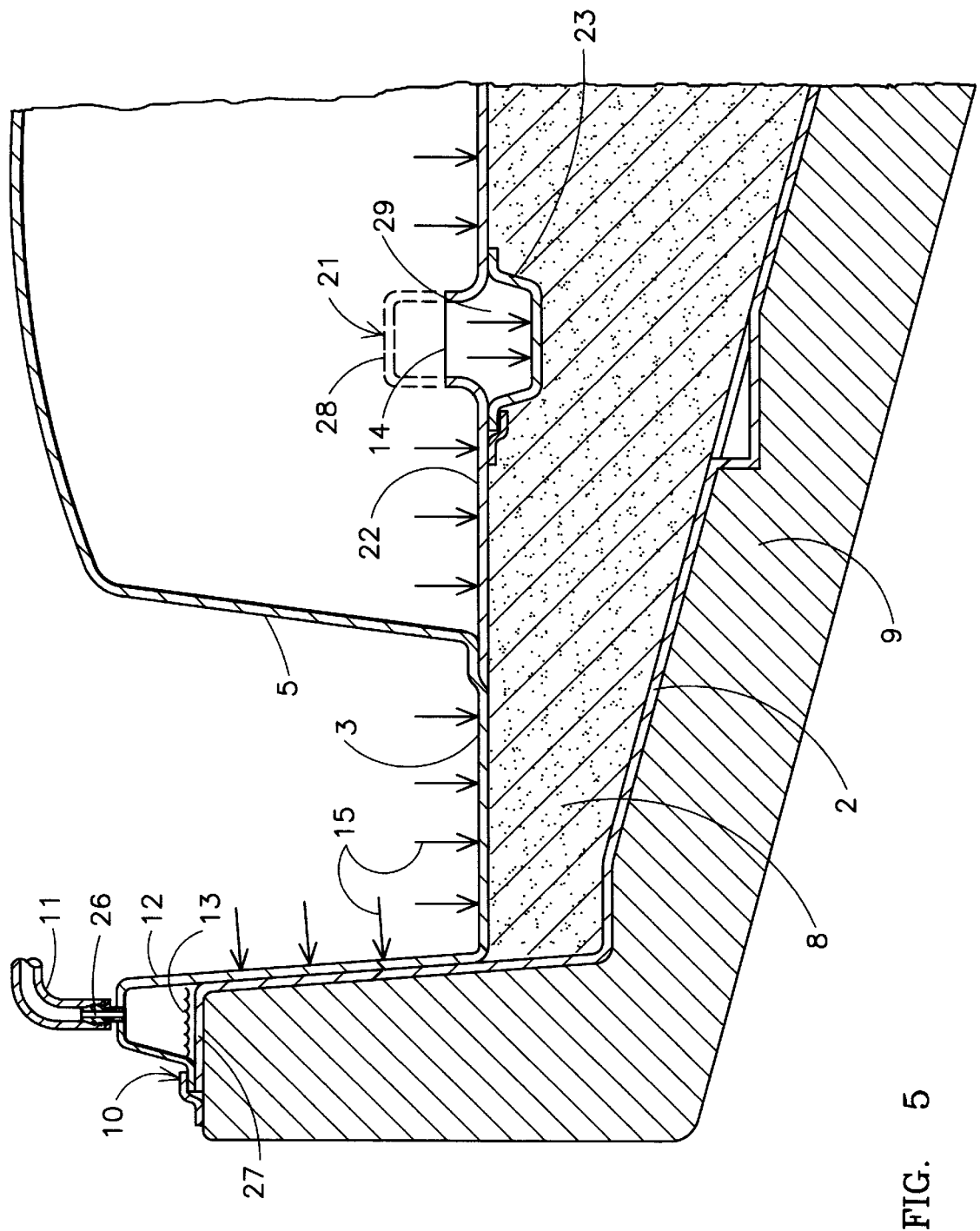
FIG. 5 is a partial cross-sectional view of a boat hull during the molding process.

FIG. 5 illustrates a boat hull being made using the same process as previously described in relation to FIG. 3 for making a boat top, with only minor differences. One major difference is that the vacuum manifold 12 is not discarded but rather remains part of the finished fiberglass hull. The edge of the hull becomes the gunwale 27 of the hull and may be covered with a rigid PVC and rubber to form a rub rail on the gunwale of the finished boat.

Another difference between a boat top and a hull is that the hollow box 5 may be used to form a console so that the console is completely finished with a finished interior from the insert 22 used during the process. Another hollow box can be used to form cable tunnels 29 in a console by using a secondary resin lay up 23 covered by the insert 22. Another atmospheric feed hole 21 in this hollow box allows the atmospheric pressure 15 to cause the secondary resin lay up 23 to become part of the mold and the top 28 is trimmed off at the trim line 14, leaving a finished interior for the cable tunnel 29, just like with the hollow boxes 5 or the consoles, instruments and beams. Such a finished interior for consoles, instruments and beams is unique to boats and boat components made using this process. Boats made with current processes leave hollow boxes with unfinished interiors which are not as appealing and subject to the elements.

The novel features of this process is that it allows for the fabrication of a sandwich laminate component having a finish on both the inside and outside layers and with hollow reinforcing boxes for beams, instruments, consoles and the like as part of the inner laminate. Also, the placement of an insert in hollow boxes to form a continuous inner layer eliminates discontinuity, thereby increasing strength and durability of the entire component. Such a component is made possible by use of a unique vacuum manifold as part of the inner layer which may be discarded if a boat top is being made or left on to form an edge or gunwale in the case of a boat hull. Also, the use of atmospheric "feed holes" in the bottom of the hollow boxes prevents the hollow boxes from collapsing from the suction created during the vacuum process and allows proper pressure to be placed against the inside of the layer to make the insert part of the inner skin of the sandwich. Again, the latter provides increased strength for the component.

Finally, this method of fabricating boat hulls and components has resulted in an approximately thirty percent cost savings in construction of such components.

Although only a few embodiments of the present invention have been described in detail hereinabove, all improvements and modifications to this invention within the scope or equivalents of the claims are covered by this invention.

Having thus described my invention, I claim:

1. A method for fabricating a sandwich fiberglass laminate component comprising:

forming a first fiberglass layer in a pre-shaped mold having a recess about a periphery of the mold for forming a vacuum manifold on the first fiberglass layer and allowing said layer to cure;

molding a second fiberglass layer in a bottom mold and allowing it to cure;

covering with resin a pre-made layer of core material and a top face of the second fiberglass layer in the bottom mold;

placing the pre-made layer of core material on to the top face of the second fiberglass layer;

placing the first fiberglass layer on the layer of core material;

applying sealing means over a peripheral flange of the first fiberglass layer and the bottom mold to form a vacuum tight seal; and connecting a vacuum conduit to the vacuum manifold and starting a vacuum pump to create sufficient vacuum until the layers of fiberglass and core material are bonded together.

2. The method of claim 1 wherein the sealing means is tape.

3. The method of claim 2 wherein any excess resin removed from the vacuum manifold is captured in a resin trap located in the conduit between the vacuum manifold and the vacuum pump.

4. The method of claim 1 wherein any excess resin removed from the vacuum manifold is captured in a resin trap located in the conduit between the vacuum manifold and the vacuum pump.

5. The method of claim 1 comprising the further step of trimming the component around its periphery to result in an edge without layer separation.

6. A method for fabricating a sandwich fiberglass laminate component comprising:

forming a first fiberglass layer in a pre-shaped mold having a recess for forming a vacuum manifold on a periphery of the mold and further having at least one recess for forming a hollow box for holding one or more items from a group consisting of beams, instruments and consoles and allowing it to cure;

while the first laminate layer is still in the mold, placing a pre-made fiberglass insert across the at least one recess for forming a hollow box, covering the insert with fiberglass laminate and allowing it to cure to form a hollow chamber;

drilling a small hole into an outer surface of each hollow chamber opposite the insert in order to form an atmospheric feed hole;

molding a second fiberglass layer in a bottom mold and allowing it to cure;

covering with resin a pre-made layer of core material and a top face of the second fiberglass layer in the bottom mold;

placing the pre-made layer of core material on to the top face of the second fiberglass layer;

placing the first fiberglass layer on the layer of core material;

applying sealing means over a peripheral flange of the first fiberglass layer and the bottom mold to form a vacuum tight seal; and connecting a vacuum conduit to the vacuum manifold and starting a vacuum pump to create sufficient vacuum until the layers of fiberglass and core material are bonded together.

7. The method of claim 6 wherein the sealing means of tape.

8. The method of claim 7 wherein any excess resin removed from the vacuum manifold is captured in a resin trap located in the conduit between the vacuum manifold and the vacuum pump.

9. The method of claim 6 wherein the at least one recess is reinforced with a metal insert placed therein and bonded before the pre-made fiberglass insert is placed across the recess, said metal insert for the purpose of attaching support beams for boats.

10. The method of claim 9 wherein any excess resin removed from the vacuum manifold is captured in a resin trap located in the conduit between the vacuum manifold and the vacuum pump.

11. The method of claim 6 wherein any excess resin removed from the vacuum manifold is captured in a resin trap located in the conduit between the vacuum manifold and the vacuum pump.

12. The method of claim 6 comprising the further step of trimming the component around its periphery to result in an edge without layer separation.

* * * * *